May 27, 1941.   F. BUCKINGHAM   2,243,413
FATIGUE TESTING MACHINE
Filed April 11, 1938   4 Sheets-Sheet 1
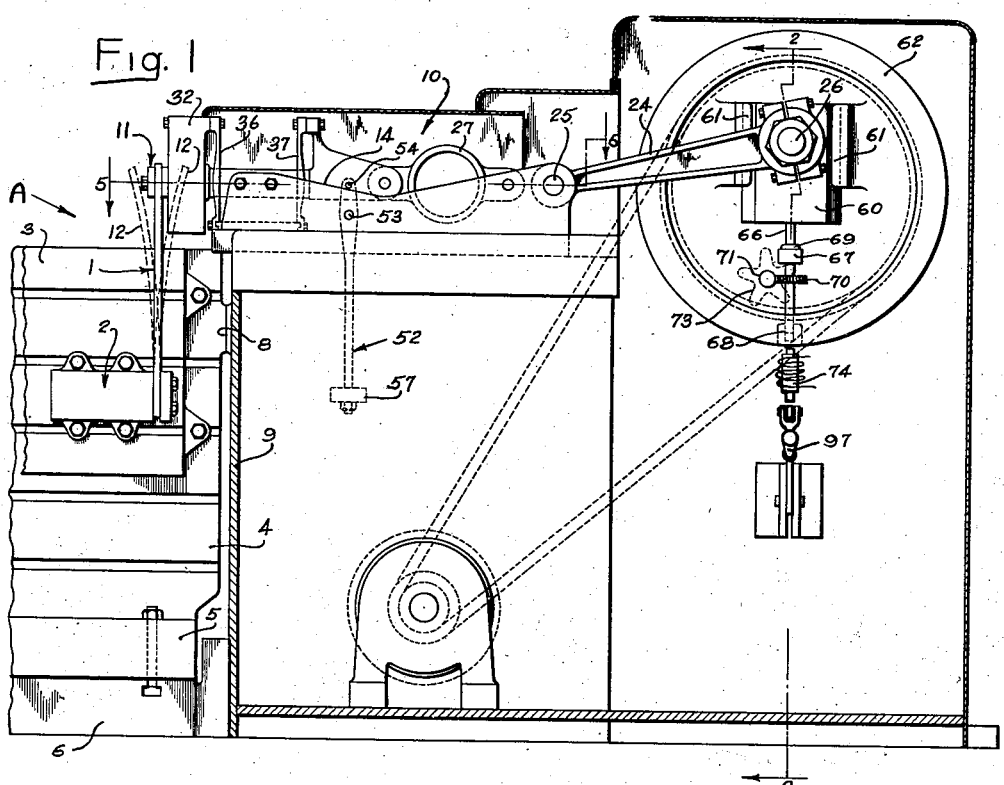
Fig. 1
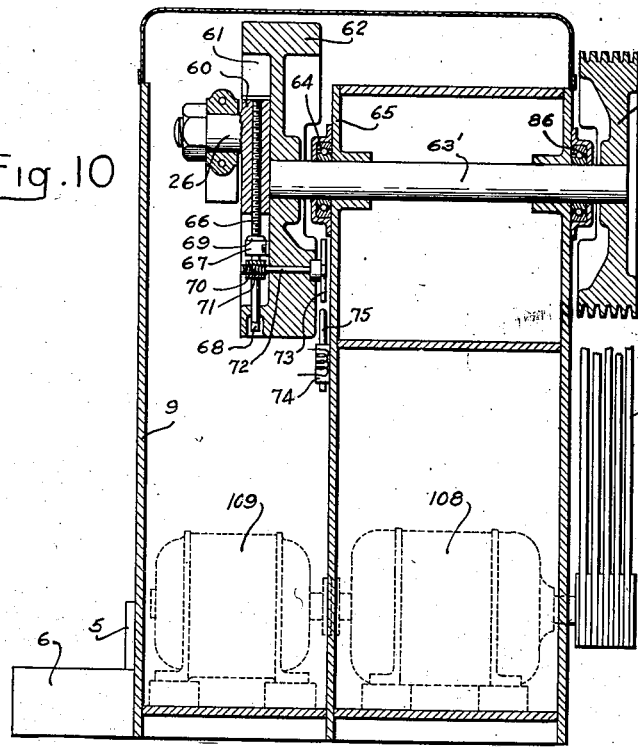
Fig. 10
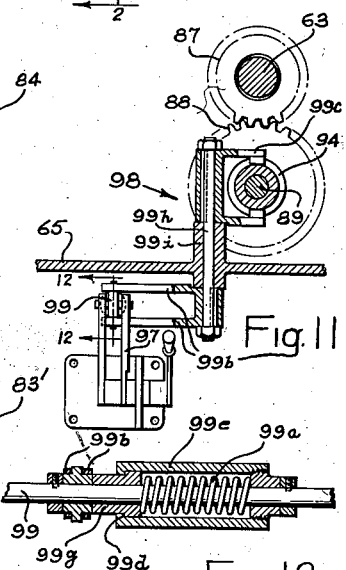
Fig. 11
Fig. 12
INVENTOR
F. BUCKINGHAM
BY
ATTORNEY

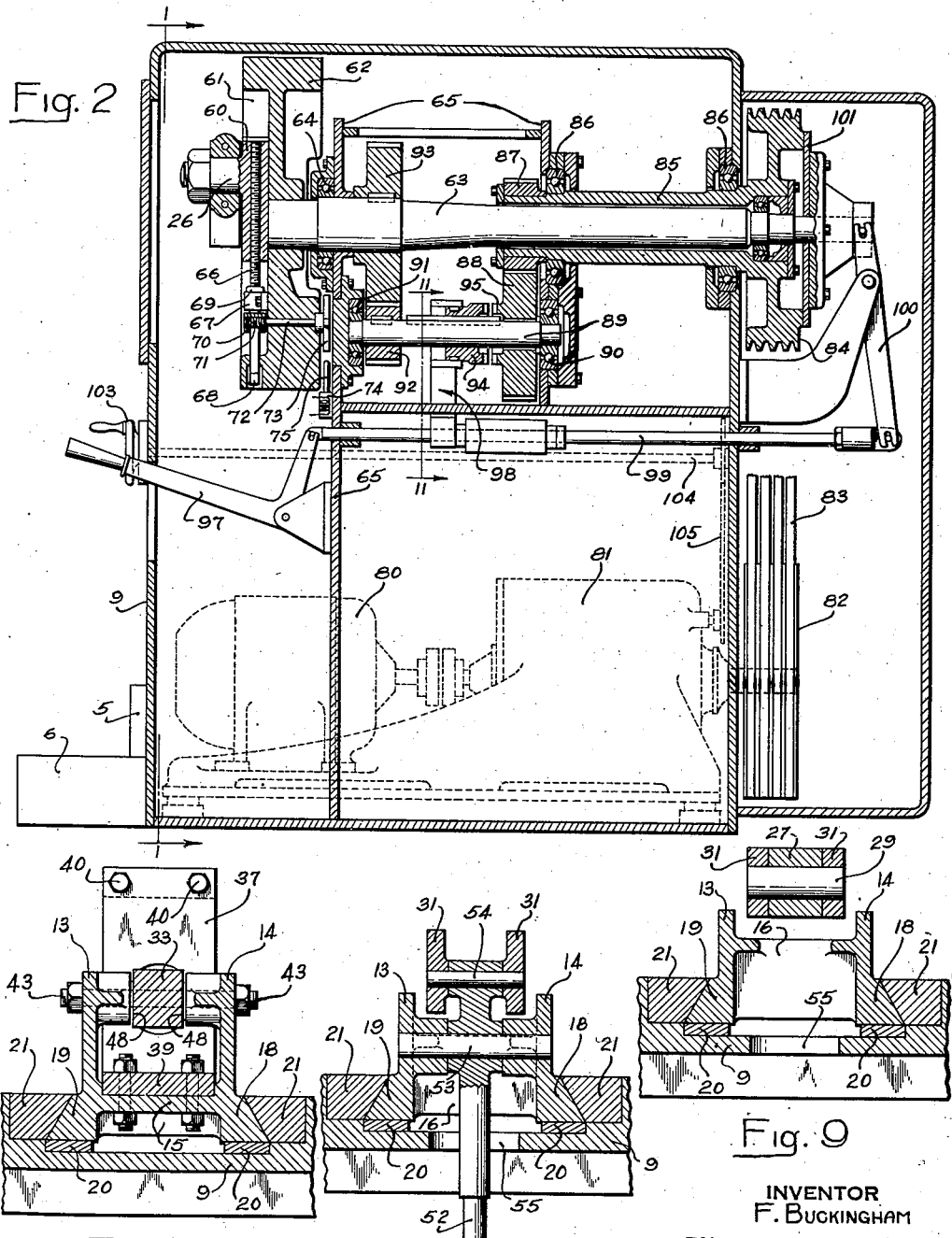

May 27, 1941.  F. BUCKINGHAM  2,243,413
FATIGUE TESTING MACHINE
Filed April 11, 1938  4 Sheets-Sheet 3
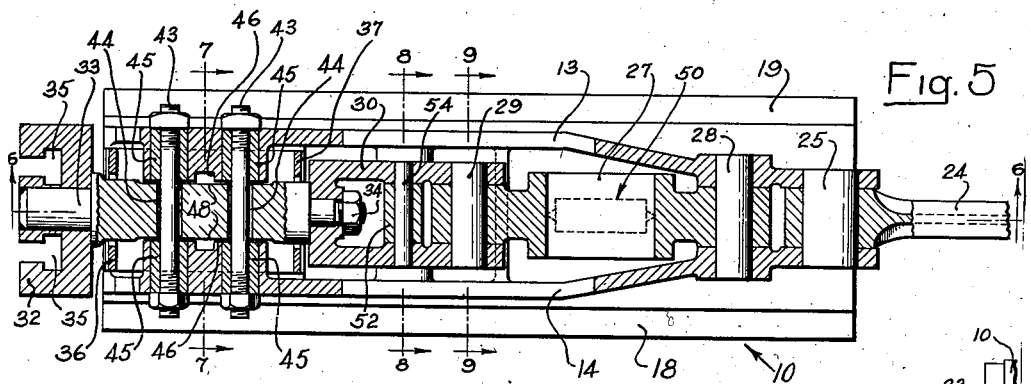
Fig. 5
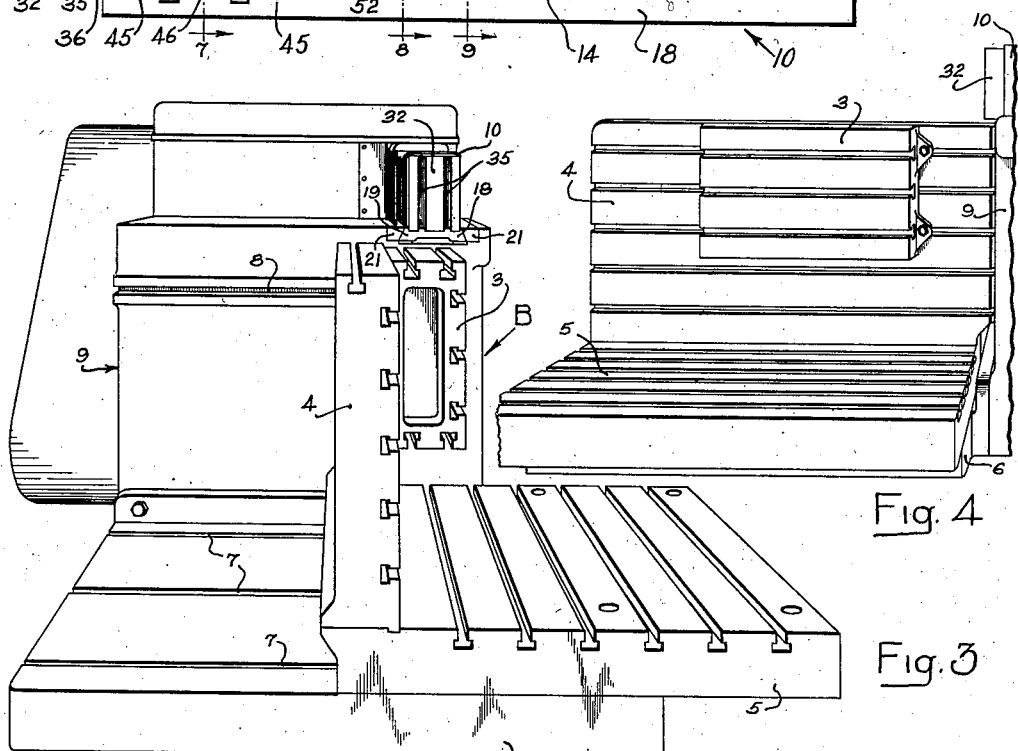
Fig. 4
Fig. 3
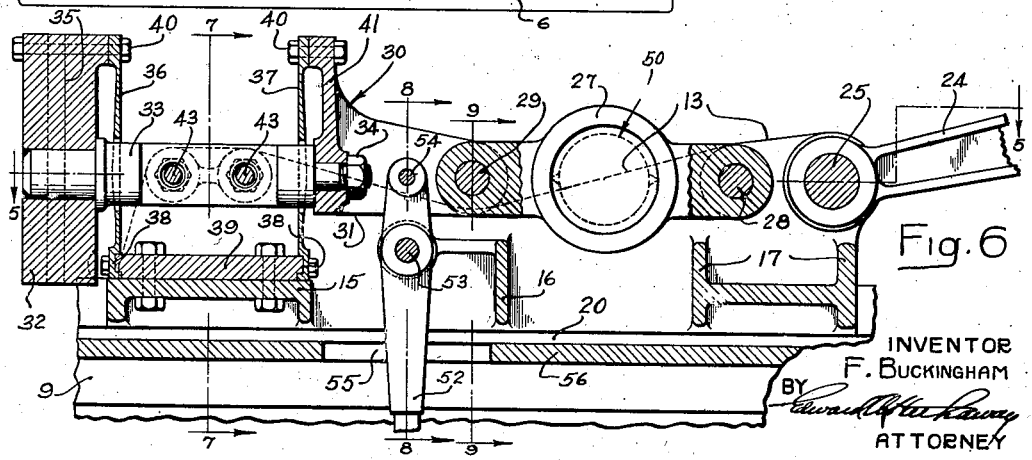
Fig. 6
INVENTOR
F. BUCKINGHAM
BY
ATTORNEY

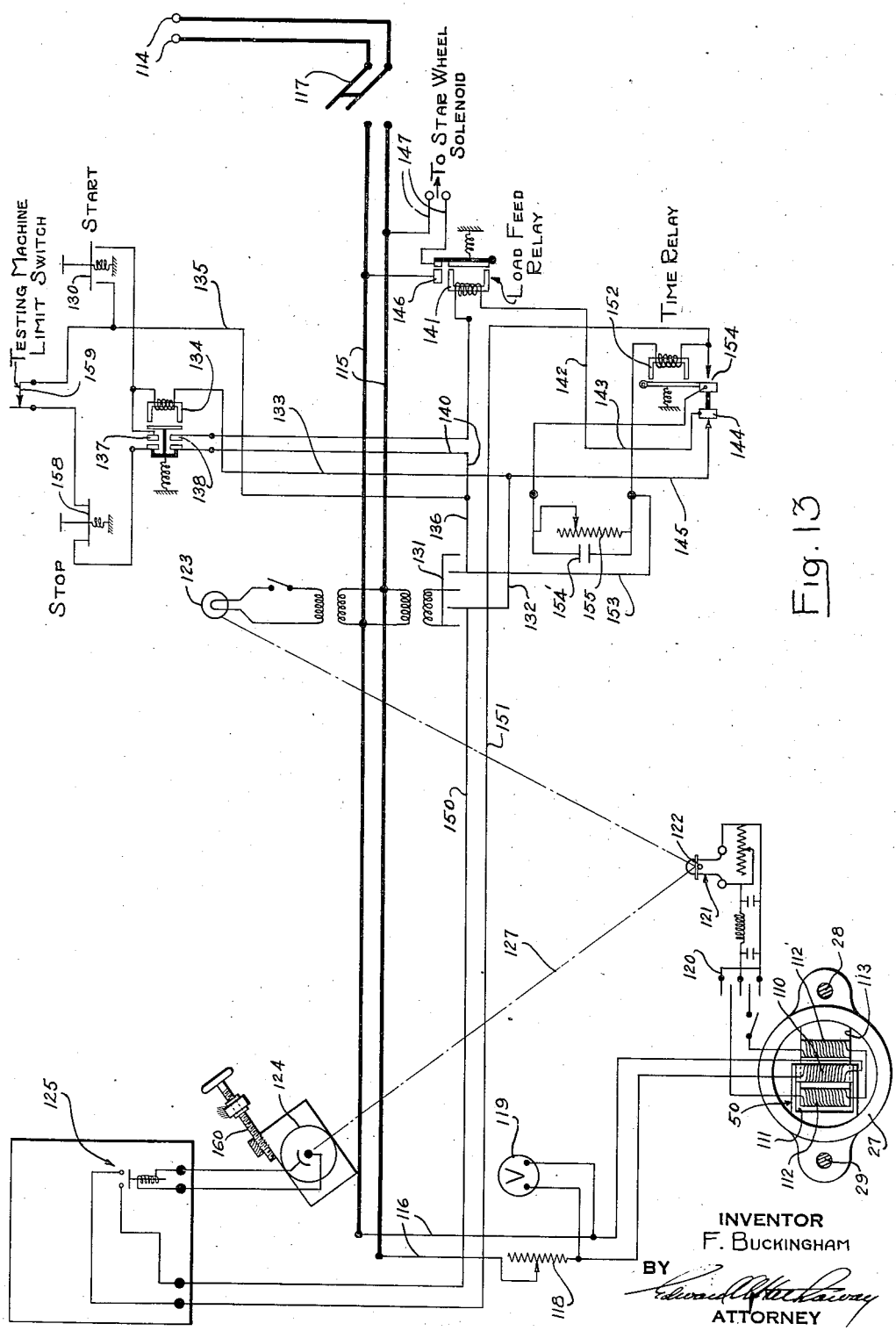

Patented May 27, 1941

2,243,413

UNITED STATES PATENT OFFICE 2,243,413

FATIGUE TESTING MACHINE

Francis Buckingham, Franklinville, N. J., assignor to The Baldwin Locomotive Works, a corporation of Pennsylvania Application April 11, 1938, Serial No. 201,428

21 Claims. (Cl. 73—51)

This invention relates generally to material testing apparatus and more particularly to an improved fatigue testing machine.

Fatigue testing has always been of considerable importance, but the machines applicable for such tests have been generally limited to standard sizes or shapes of specimens as well as being deficient in certain operating characteristics. It is desirable to test full size machine elements, especially in the automotive field, wherein connecting rods and a large number of other parts make up present-day automobiles. Such parts with their large variety of shapes and sizes involve complications not only as to providing a single machine adapted for testing such parts but in also effecting predetermined conditions of test such as speed and load. When the specimen begins to fail, the load will progressively decrease unless suitably adjusted. It is especially desirable to maintain the load constant throughout the test although under certain conditions of operation a variable load may be desired.

It is an object of my invention to provide an improved reciprocating type fatigue testing machine together with improved means for determining the reciprocating load applied to the test piece. A further object is to provide improved means for maintaining a substantially constant load on the specimen as it progressively fails. To this end, I have provided improved means for adjusting the reciprocating stroke during operation of the machine and automatically in response to the load on the test piece.

A further object is to provide improved means for balancing the inertia forces of the reciprocating sensitive weighing elements of the testing machine independently of inertia forces that might exist in other reciprocating load transmitting elements.

Another object is to provide an improved combination whereby positive mechanical pulsating forces may be transmitted either through the load weighing system or directly to the test piece without passing through the weighing system.

A still further object is to provide an improved fatigue testing machine that is relatively simple, compact and rugged together with having a high degree of sensitivity, accuracy, ease of adjustment and adaptability to specimens of various shapes and sizes.

Other objects and advantages will be more apparent to those skilled in the art from the following description of the accompanying drawings in which:

Fig. 1 is a side elevation of my improved fatigue testing machine taken substantially on the line 1—1 of Fig. 2;

Fig. 2 is a transverse section taken on the line 2—2 of Fig. 1;

Fig. 3 is a perspective view looking directly at the front of the machine in the direction of arrow A, Fig. 1, to show the specimen supporting tables and their range of adjustments;

Fig. 4 is a fragmentary perspective of the specimen supporting table viewed in the direction of arrow B of Fig. 3;

Fig. 5 is a horizontal section taken on the line 5—5 of Figs. 1 and 6;

Fig. 6 is a vertical longitudinal section taken on the line 6—6 of Fig. 5;

Figs. 7, 8 and 9 are respectively transverse sections taken on the lines 7—7, 8—8 and 9—9 of Figs. 5 and 6;

Fig. 10 is a transverse section similar to Fig. 2 but showing a modified driving arrangement;

Fig. 11 is a transverse section taken on line 11—11 of Fig. 2;

Fig. 12 is a vertical axial section taken on line 12—12 of Fig. 11;

Fig. 13 is a diagrammatic outline of electrical and mechanical features of the load responsive control system.

The specimen to be tested may be a standard test piece or any one of a large number of machine elements such as engine connecting rods and crankshafts, steering knuckles, axles and axle housing for automobiles, etc. A specimen diagrammatically indicated at 1, Fig. 1, has its lower end rigidly secured to a suitable fixture generally indicated at 2. This fixture is bolted to a heavy plate 3 which is supported upon a heavy angle frame having a vertical portion 4 and a horizontal portion 5. The plate 3 is provided with a series of T slots in its outer, upper and lower faces, while a series of T slots in the vertical and horizontal portions 4 and 5 permit plate 3 to be supported at various vertical and horizontal positions or allow various parts to be secured directly to the angle frame. The angle frame is also longitudinally slidably supported upon a heavy base 6 through suitable tongue and grooves 7 while the vertical portion 4 has a slidable tongue and groove connection 8 with a main housing generally indicated at 9. The housing and base 6 are suitably rigidly connected together.

Mounted upon housing 9 is a reciprocating frame or head 10 carrying a weighing system, to be described, which is connected at 11 to the upper end of specimen 1. Reciprocation of head 10 causes the specimen to be alternately flexed as indicated by dotted lines 12, Fig. 1. The reciprocating head specifically comprises a horizontally elongated frame having sides 13 and 14, Figs. 5 and 6 to 9, cross-connected by a forwardly located horizontal rib 15 and by intermediate and rearwardly located vertical ribs 16 and 17. Extending longitudinally and laterally of the head are guides 18 and 19 slidably supported in guideways formed by wearing strips 20 and gibs 21 slidably bolted or otherwise held in position on the upper portion of housing 9. This head is reciprocated by a connecting rod 24 pivotally connected at one end by a pin 25 to said head and connected at its other end to a crankpin 26, Figs. 1 and 2.

To transmit reciprocating loading forces from the head to the specimen and to weigh or measure the load thereon, a very heavy but slightly elastic weighing ring 27 has two oppositely extending lugs respectively pivotally connected at 28 to side walls 13 and 14 and at 29 to a combined load transmitting and sensitive weighing unit generally indicated at 30, Figs. 5 and 6. This unit is specifically shown as comprising a multiplicity of rigidly connected parts including a bifurcated end section 31 to which pin 29 is connected and a specimen platen 32, said end section and platen being connected by a rod 33 one end of which is welded or otherwise suitably secured in platen 32 while the other end is bolted as at 34 to end section 31. The specimen platen 32 is provided as shown in Fig. 5 with a pair of vertical T slots 35 for receiving suitable bolts for clamping a specimen as shown at 11, Fig. 1. To allow the sensitive unit 30 to be rigidly held against lateral or vertical movements relative to the reciprocating head 13, 14, 15, etc., but at the same time allow said sensitive unit to have complete freedom of movement in a longitudinal direction relative to the reciprocating head, there is provided two flexible stay plates 36 and 37 which are relatively wide in a transverse direction as shown in Fig. 5 and are relatively thin although preferably tapered from their mid-sections toward their ends as shown in Fig. 6. The lower ends of these stay plates are rigidly held by bolts and keyways generally indicated at 38 to a plate 39 which in turn is securely fastened to cross-rib 15. The upper ends of the stay plates are bolted as at 40 to the specimen platen 32 and to an upstanding portion 41 of the bifurcated end section 31. This sensitive unit is thereby firmly held against any movement normal to the axis of rod 33 but is free to have longitudinal movement which is maintained on a horizontal axis at all times by the action of stay plates 36 and 37 which will flex to maintain the effect of a parallelogram. The flexure of the stay plates is very minute in actual operation as will be seen shortly.

Under certain conditions it is desirable to eliminate the weighing operation which is done by clamping the sensitive unit 30 to the reciprocating head, thereby preventing any relative movement between the sensitive unit and the reciprocating head. This is accomplished by providing, specifically, a pair of bolts 43 extending transversely through the forward ends of side walls 13 and 14 and through slightly enlarged openings 44 in tie rod 33. Bushings 45 surround one end of bolts 43 and are formed in wall 13 and bosses 46 concentric with bolts 43. Similar bosses and bushings are provided for the other end of the bolts in the opposite wall 14. All of the bushings 45 have a snug but slidable fit in said bosses whereby upon tightening of bolts 43 the nuts thereof cause the opposed bushings to be drawn toward each other tightly against flatted surfaces 48 on tie rod 33. The sensitive head is thereby immovably held to side walls 13 and 14 so that reciprocating movement is transmitted from connecting rod 24 to the side walls 13 and 14 and thence through bushings 45 to tie rod 33, thereby shunting the load around weighing ring 27 to render the same inoperative.

To determine the loading force transmitted to a specimen, bolts 43 are loosened whereupon bushings 45 will either work away from or be sufficiently free of flatted surfaces 48 to allow the sensitive unit 30 to move relative to the reciprocating head. In this case loading forces are transmitted from connecting rod 24 through pins 25 and 28 and thence through weighing ring 27, pin 29 and sensitive unit 30 to the specimen clamped to platen 32. The loading force causes elastic ring 27 to be deformed in proportion to the force transmitted therethrough. The deformation of ring 27 is measured by a suitable strain gauge generally indicated at 50 disposed within and engaging the opposed walls of the hollow interior of ring 27.

To obtain maximum accuracy of the load force transmitted to the specimen, it is necessary to compensate for the inertia forces present in the sensitive unit 30 but any such compensation must not interfere with the sensitive and minute longitudinal movements of the unit 30 relative to the reciprocating head. To accomplish this, I have provided as shown in Figs. 1 and 6 an inertia compensating arm 52 extending vertically down within housing 9 and pivotally supported as at 53 between side walls 13 and 14 of head 10 while the upper end of said arm is disposed in the bifurcation of end section 31 and pivotally connected thereto as at 54, Figs. 5 and 6. A slot 55 is formed in the upper wall 56 of housing 9 through which the compensating arm 52 extends. A weight 57, Fig. 1, is supported on the lower end of arm 52 and is of any suitable mass as may be variously determined in accordance with the size of the specimen being tested inasmuch as the inertia of the specimen has some effect upon the sensitive unit 30 by virtue of being rigidly secured thereto. The compensating arm 52 reciprocates bodily with reciprocating head 10 and hence any tendency of the momentum or inertia of sensitive head 30 and of the specimen is counterbalanced by a similar inertia or momentum created by weight 57. These inertia or momentum forces oppose each other by virtue of the respective forces acting on opposite sides of the pivot pin 53.

*Stroke adjusting mechanism.*—It is desired to maintain a substantially constant load on the specimen from the beginning of the test on through to failure of the specimen. If the stroke of the reciprocating head remains constant during progressive failure of the specimen, then the specimen offers less resistance to movement and accordingly the load applied decreases. This can be compensated for only by increasing the stroke when and as the load tends to decrease. To increase the stroke during operation of the machine, crankpin 26, Figs. 1 and 2, is formed rigidly with a slide block 60 which is guided in a radial guideway 61. This guideway is formed rigidly with a relatively heavy flywheel 62 and the block and guideway have tapered guiding surfaces to firmly hold the block 60 in position. The flywheel is secured to a drive shaft 63 supported by bearings 64 of a suitable framework 65. To radially adjust crank 26, a screw 66 has threaded engagement with block 60 and is supported in a bearing 67 secured to the face of flywheel 62. The lower end 68 of the screw is provided with a square wrench end for manual adjusting or assembling purposes. A suitable thrust collar 69 secured to screw 66 engages one side of bearing 67 while the hub of a worm gear 70 engages the other side of said bearing, thereby to hold the screw against axial displacement. To rotate the screw, a worm 71 engages worm gear 70 and is mounted on a shaft 72 journalled in the flywheel. Means for rotating the worm shaft 72 is specifically shown herein as comprising a star wheel 73 secured to shaft 72. To rotate the star wheel in response to predetermined load conditions, such as a decrease in load below a predetermined value, a solenoid 74 is secured to frame 65 whereby upon energization of the solenoid its plunger 75 is moved upwardly into the path of star wheel 73 and hence during the successive revolutions of the flywheel, the star wheel will engage plunger 75 and be rotated relative to the flywheel, thereby causing screw 66 to be rotated with consequent radial adjustment of crankpin 26. The stroke of the reciprocating head will be accordingly increased and will continue to be further increased so long as the solenoid plunger 75 remains in the path of star wheel 73. Upon deenergization of solenoid 74, plunger 75 will drop by gravity or be biased by a spring out of the path of the star wheel. The means for controlling energization of solenoid 74 in accordance with load transmitted through weighing ring 27 will be described hereinafter.

*Driving mechanism.*—Shaft 63 is driven by an electric motor 80 and variable speed reducing gear mechanism 81, both disposed in the bottom of housing 9, through pulleys 82 and 84 connected by a belt 83. Pulley 84 is secured to a sleeve 85 journalled in housing 9 and in frame 65 by a bearing 86. Sleeve 85 has a gear 87 meshing with a gear 88 which is idly journalled on a shaft 89 supported in frame 65 by bearings 90 and 91. Gears 92 and 93 are respectively keyed to the shafts 89 and 63 while a dog clutch 94 is slidably splined to shaft 89 for engagement with cooperating clutch teeth 95 on gear 88. To obtain slow speed rotation of flywheel 62, a pivoted bellcrank hand lever 97 is moved downwardly thereby causing clutch shifting fingers and shaft generally indicated at 98 to engage clutch 94 with clutch teeth 95 and simultaneously cause an operating rod 99 and lever 100 to throw a clutch 101 out of engagement. As a result, power is transmitted from pulley 82 through belts 83, pulley 84, sleeve 85, gears 87, 88, shaft 89, gears 92 and 93 to rotate crankshaft 63. To effect high speed rotation of the crankshaft, the bellcrank lever 97 is moved to its uppermost position as shown in Fig. 2 thereby disengaging clutch 94 and engaging clutch 101, whereupon pulley 84 is directly connected to crankshaft 63 to effect high speed rotation thereof. To obtain intermediate speeds, the variable speed transmission 81 of any suitable and well-known type can be adjusted by a hand wheel 103 connected to a shaft 104 and chain 105. Details of construction of this speed change transmission per se do not form a part of my present invention and hence further description thereof is not deemed necessary.

The positive tooth clutch elements 94, 95 are adapted for direct engagement with each other by reason of the low speed of rotation of shaft 89 and because control shaft 99 is yieldably connected, in its movement to the left, through a spring 99a, Fig. 12, to arms 99b and 99c of the clutch shipping mechanism 98, Fig. 11. Movement of shaft 99 to the right causes positive disengagement of clutch 94, 95 through mechanical abutment 99d between a housing 99e fixed to shaft 99 and a telescopic sleeve 99g slidable thereon. Arms 99b and 99c are keyed to a vertical shaft 99h journalled in a suitable bearing 99i which is formed with or secured to a horizontal wall of frame 65. This low speed is useful not only for initially adjusting the machine or during a low speed test but also for starting the machine when a heavy load is to be suitably applied to a specimen followed by a subsequent high speed of operation. In this latter case the clutch 94 is initially engaged to start movement of the reciprocating and rotating masses and then the clutch lever 97 is moved downwardly to quickly engage the high speed clutch 101.

In the modification of Fig. 10, the crankshaft 63' is driven at all times directly from the motor 108 through belts 83'. A generator 109 is connected to motor 108 to provide electrical current at a desired voltage for the load responsive control apparatus although in the preferred form of Fig. 2, the load control supply current is obtained from any suitable source as illustrated in the diagrammatic outline to be described. The remaining structure of Fig. 10 is the same as in Fig. 2 and corresponding parts are given the same reference numbers.

*Load responsive control system.*—As shown in Fig. 13, the magnetic strain gauge 50 is of a customary type consisting preferably of a single exciting coil 110 mounted in a framework 111 and a pair of inductance coils 112 supported on each side of coil 110 in a suitable frame 113. The two coil frames are attached to the inner periphery of the weighing ring at opposite points thereof and in longitudinal alignment with pivot pins 28 and 29 whereby any deformation of the weighing ring will cause relative rectilinear movement between the field coil 110 and the inductance coils 112. The coil 110 is normally in a neutral position between the coils 112 when the weighing ring 27 is not under load. Hence the coils 112 will respond either to a compression or tension force applied to the weighing ring. The exciting coil is normally supplied with current through wires 115 and 116 from a suitable A. C. source 114. A supply switch 117 and an adjustable rheostat 118 and voltmeter 119 are provided. The two coils 112 are connected in series with each other and with a rectifier 120, the direct current side of which is connected to an oscillograph vibrator 121. A usual oscillatable mirror diagrammatically indicated at 122 is adapted to reflect light from a source lamp 123 to a photoelectric cell 124. The lamp 123 is energized from the main supply line 115, while the photoelectric cell is connected to any suitable or usual photoelectric relay, diagrammatically indicated at 125.

The strain gauge 50 is the only load control element forming a part of the reciprocating head of the machine, all other control elements being located either on the stationary part of the machine or in a suitable cabinet as may be desired with wires leading thereto from the strain gauge. The remaining control elements and the circuits therefor will be readily understood from the following description of the mode of operation thereof Assuming that the machine is operating with the reciprocating head 10 imposing a relatively small load on the specimen below the desired predetermined load value. To automatically increase the stroke of the testing machine and thereby increase the load on the specimen, the operator momentarily closes a normally open load control starting switch 130 whereupon current is supplied from main line 115 through a rectifier 131 and thence through wires 132 and 133, a holding circuit relay 134, switch 130 and wires 135 and 136 to the other side of rectifier 131. Energization of holding relay 134 causes switches 137 and 138 to be held closed. These switches are mechanically connected to, but insulated from, each other. A loading relay circuit is now energized to supply current to the star wheel solenoid 74. This circuit is supplied from main line 115 through rectifier 131, wires 136, 140, relay switch 138, star wheel relay 141, wires 142 and 143 to switch 144 closed by a suitable spring and thence through wires 145 and 132 to the other side of rectifier 131. Closure of relay switch 146 supplies current from the main line 115 through wires 147 to energize solenoid 74 and accordingly move plunger 75 into the path of star wheel 73 to cause screw 66 to increase the stroke of reciprocating head 10. The solenoid plunger 75 will remain in the path of the star wheel so as to continually increase the stroke and load on the specimen. When the desired load is finally obtained, the weighing ring 27 will be sufficiently strained to cause coils 110 and 112 to transmit current impulses of sufficient magnitude to oscillograph 121 whereby mirror 122 will be oscillated so as to direct a beam of light 127 on to photoelectric cell 124. Energization of photoelectric cell 124 causes current to flow from supply wires 115 through rectifier 131 and thence through wire 150, relay 125, and wire 151 to a time relay 152 and wire 153 to the other side of rectifier 131. Time relay 152 thereupon opens switch 144 to break the circuit through the load feed relay 141. The solenoid plunger 75 thereupon withdraws from the path of star wheel 73 to allow the crank stroke to remain fixed.

The alternate tension and compression loads transmitted from the reciprocating head 10 through weighing ring 27 will cause coils 110 and 112 to produce a pulsating current passing from one extreme value through zero to the other extreme value. These pulsations will vary in accordance with the speed of rotation of crankshaft 26 and as a result the oscillograph mirror 122 will cause the light beam to be moved on to and off of the photoelectric cell 124 with the same frequency. Inasmuch as it is not desired to have the stroke further adjusted so long as the light beam is able to strike the photoelectric cell, the time relay 152 is operative to bridge over the momentary periods of deenergization of the photoelectric cell which occur with each stroke. This bridging is accomplished by providing a condenser 154' and an adjustable discharging rheostat 155 in a parallel circuit across relay 152. This parallel circuit is closed by a switch 154 insulated from but mechanically connected to switch 144 whereby switch 154 is closed when switch 144 opens. During the successive instants that the pohtoelectric cell is deenergized, current will not be supplied through wires 151 and 132 to the time relay 152, but the condenser 154' discharges to energize relay 152 and thereby maintain switch 144 open so as to prevent reclosure of the load feed relay 141. The resistance 155 is adjusted in accordance with the speed at which the machine is operated so that the time relay switch 154 remains closed provided that the load on weighing ring 27 returns to the predetermined value on each stroke of the reciprocating head thereby to reenergize the photoelectric cell, or provided that the desired load recurs before expiration of the time at which the time relay is set to open. In case the load decreases so that the light beam fails to strike the photoelectric tube 124 within the time interval set for the time relay 152, then the time relay will be deenergized to allow switch 154 to open and switch 144 to close, thereby reestablishing a circuit for load feed relay 141 whereupon the star wheel solenoid 73 is energized to cause a further increase in the stroke. When the desired load is reestablished, the solenoid circuit is opened as previously described.

To discontinue the automatic load control, the operator merely momentarily opens the normally closed stop switch 158, thereby opening the holding circuit for solenoid 134. Switch 138 thereupon opens to break the control circuits. To provide a maximum limit for the stroke of the reciprocating head 10, a limit switch 159 is placed on the upper portion 56 of housing 9 to be engaged by a suitable cam projecting laterally from side 13 of the reciprocating head 10 thereby to open switch 159 when the reciprocating head has a predetermined maximum stroke. This limit switch opens the holding circuit for relay 134 and shuts down the automatic stroke control circuits in the same manner as was done by opening of stop switch 158.

To adjust the predetermined load value at which it is desired to operate the machine, the position of photoelectric cell 124 can be laterally adjusted in any suitable manner. As diagrammatically shown the cell is mounted upon a suitable rectilinearly movable frame adapted to be shifted by manual rotation of a screw 160. For low load values the cell 124 is shifted to the left and for higher loads it is shifted to the right.

*Operation.*—The angle frame 4, 5 is adjusted along guideways 7 and 8 to any desired transverse position and plate 3, if used, is suitably located and supported upon the angle frame, all for the purpose of accommodating and anchoring one end of any suitable machine part or specimen such as diagrammatically indicated at 1, Fig. 1. The upper end of the specimen is then secured to reciprocating platen 32. Bolts 43 are loosened and thereafter crankshaft 63 is initially rotated at a slow speed by motor 80. The crank throw 26 has been previously manually adjusted by application of a wrench to the lower end of screw 66, thereby to cause connecting rod 24 to impart a predetermined extent of reciprocation to head 10. The loading force is transmitted through weighing ring 27 to sensitive unit 30 and thence to the free end of the specimen to cause alternate deflection thereof on opposite sides of its neutral axis if alternate compression and tension stressing is desired. However, if desired, compression stressing only, or tension stressing only, may be obtained merely by fastening the specimen in an unstressed condition to reciprocating head 10 when the latter is at the extreme end of its forward or rearward stroke. The load imposed upon the specimen causes elastic weighing ring 27 to be deformed, the extent and direction of deformation being an indication of the magnitude and character of load transmitted. This deformation is measured by a strain gauge 50 which initiates operation of the stroke control system above described. During the reciprocation of head 10, sensitive unit 30 is maintained in parallelism with the base of the machine by virtue of stay plates 36 and 37 which plates firmly resist any lateral or distortional movements of the sensitive unit and weighing ring 27. Inertia of the specimen and sensitive unit 30 is counterbalanced by arm 52 and weight 57 shown in Fig. 1. When the specimen begins to fail, and as it continues to progressively fail, the strain gauge 50 causes solenoid 74 to move solenoid plunger 75 into the path of star wheel 73 during rotation of flywheel 62, thereby to rotate screw 66 and effect radial outward movement of crankpin block 60 to increase the stroke and thereby maintain a substantially constant load on the specimen. This is continued up to the point of specimen failure. If it is desired to effect high speed operation or if the repeated stresses in the specimen will be of a very large number before failure starts, then bolts 43 are tightened to cause bushings 45 to firmly clamp tie rod 33 to the side walls 13 and 14 to reciprocate as an integral unit therewith. During this operation the weighing ring 27 is inoperative, the load forces being transmitted from connecting rod 24 through the side walls 13 and 14 to bushings 45 and tie rod 33 to platen 32. In this operation the apparatus can be driven at a very high speed with minimum wear and tear on the apparatus. The bolts 43 may be loosened or tightened while the machine is operating under its slow speed of say 5 or 10 strokes per minute.

From the foregoing disclosure it is seen that I have provided an extremely rugged, compact and yet highly sensitive and accurate fatigue testing machine adapted to maintain a substantially constant load on a specimen from the beginning of a test to the end thereof, this being accomplished automatically in direct response to the actual load imposed on a specimen, thereby insuring uniform control and results. The machine is readily adapted to a wide variety of products each adapted to be tested in a similar manner and with the same degree of precision results. As is customary with fatigue testing machines, any usual shaft revolution counter may be employed.

It will of course be understood that various changes in details of construction and arrangement of parts may be made by those skilled in the art without departing from the spirit of the invention as set forth in the appended claims.

I claim:

1. A fatigue testing machine comprising, in combination, means for supporting a specimen, a reciprocable element connectable to the specimen, mechanical actuating means for continuously reciprocating said element to effect repeated stress applications to the specimen, deformable load weighing means connected to and between said element and said actuating means so as to be bodily reciprocable with said element whereby actual load forces are transmitted at each instant through said deformable weighing means to the specimen, and means connected to and directly actuated by the deformation of said load weighing means thereby to determine the actual load applied to the specimen independently of movements of the specimen.

2. A fatigue testing machine comprising, in combination, means for supporting a specimen, a reciprocable element connectable to the specimen, actuating means for continuously reciprocating said element to effect repeated stress application to the specimen, and means connected to and between said element and said actuating means so as to be bodily reciprocable with said element for determining the actual load applied to the specimen at each instant during continuous reciprocation of said element including an elastic load weighing ring and strain responsive means directly connected to and operated by the opposite sides of said ring.

3. A fatigue testing machine comprising, in combination, means for supporting a specimen, a reciprocable element connectable to the specimen, actuating means for continuously reciprocating said element to effect repeated stress application to the specimen, deformable load weighing means interposed between said actuating means and said element and connected to each of the same for bodily reciprocation therewith whereby load is transmitted from said actuating means through said weighing means to said element throughout the full range of specimen loading, and means connected to and directly actuated by the deformation of said load weighing means independently of movement of said specimen.

4. The combination set forth in claim 3 further characterized in that said interposed weighing means comprises a weighing ring and strain responsive means connected to and operated directly by the opposite sides of said weighing ring for determining the load transmitted therethrough.

5. A fatigue testing machine comprising, in combination, means for supporting a specimen, a reciprocable element connectable to the specimen, a continuously rotating crank, means for connecting said crank to said element for reciprocating the same, means for effecting an adjustable crank throw during continuous rotation of the crank, and means responsive to the specimen load for automatically adjusting the crank throw.

6. A fatigue testing machine comprising, in combination, means for supporting a specimen, a reciprocable element connectable to the specimen, actuating means for reciprocating said element, mechanism for varying the length of stroke of said reciprocating element, and means for operating said stroke adjusting means automatically in response to load transmitted to the specimen.

7. A fatigue testing machine comprising, in combination, means for supporting a specimen, a reciprocating element connectable to the specimen, actuating means for reciprocating said element, and means automatically responsive to the actual load transmitted to a specimen for maintaining a substantially constant load on the specimen by varying the length of the reciprocating stroke of said element.

8. A fatigue testing machine comprising, in combination, means for supporting a specimen, a reciprocable element connectable to the specimen, mechanical means rotatable at a constant speed for reciprocating said element, mechanism for determining the actual load on the specimen during reciprocation of said element, and means controlled by and automatically responsive to the operation of said mechanism for maintaining a substantially constant load on the specimen by varying the length of stroke produced by said mechanical means while the latter rotates at a constant speed.

9. A fatigue testing machine comprising, in combination, means for supporting one portion of a specimen, a reciprocable element connectable to another portion of the specimen, actuating mechanism for reciprocating said element to impose a load on the specimen, load weighing means, means for transmitting load from said actuating mechanism through said weighing means to the specimen, and means alternatively operative to shunt said weighing means and transmit load directly to said specimen from said actuating mechanism.

10. A fatigue testing machine comprising, in combination, means for supporting a specimen, a reciprocable element connected to the specimen, mechanical actuating means for reciprocating said element, weighing means interposed between said mechanical actuating means and said reciprocable element and connected to each of the same whereby load is transmitted through said weighing element, and means for effecting a direct mechanical connection between said actuating means and reciprocable element so as to shunt said weighing means while said weighing means remains connected to said reciprocable element and to said actuating means.

11. A fatigue testing machine comprising, in combination, means for supporting and rigidly anchoring one end of a specimen, a reciprocable head, actuating means connected to said head for reciprocating the same, a combined load transmitting and sensitive load weighing means entirely supported by said head for bodily reciprocating movement therewith as a self-contained part thereof and operative to have movement relative thereto, and means for rigidly securing the other end of the specimen to said combined load transmitting and sensitive weighing means.

12. The combination set forth in claim 11 further characterized in that said combined load transmitting and weighing means includes a sensitive unit, and flexible stay plates for supporting said unit by said reciprocating head.

13. A fatigue testing machine comprising, in combination, means for supporting a specimen, a reciprocable head, actuating means connected to said head for reciprocating the same, a sensitive weighing unit supported by said head for bodily reciprocating movement therewith and operative to have movement relative thereto, said weighing unit having inertia effects arising from said reciprocating action and said inertia effects tending to produce undesirable movement of the sensitive weighing unit relative to said reciprocable head, means for securing a specimen to said sensitive weighing unit, and means movable relative to and also bodily movable with said head and connected to said sensitive weighing unit for counterbalancing said inertia effects thereof arising from said reciprocating movement.

14. A fatigue testing machine comprising, in combination, means for supporting a specimen, a reciprocable element connectable to the specimen to impart a pulsating load thereto, actuating means for reciprocating said element, means for adjusting the extent of reciprocation of said element, means for determining the load applied to the specimen including a photoelectric cell, and means associated with said cell for controlling said adjusting means to maintain a predetermined load on the specimen.

15. The combination set forth in claim 14 further characterized by the provision of means for causing said associated means to maintain a stabilized condition so long as a given series of pulsating loads reach a predetermined value.

16. A fatigue testing machine comprising, in combination, means for supporting a specimen, a reciprocable element connectable to the specimen, actuating mechanism for reciprocating said element, means for adjusting the stroke of said element, and means responsive to a predetermined stroke of said reciprocable element for rendering said stroke adjusting means inoperative in tending to produce any further adjusting action.

17. A fatigue testing machine comprising, in combination, a base having a guideway, a frame slidably supported on said guideway, means connected to said frame for reciprocating the same, specimen engaging means, means connecting said specimen engaging means to said frame so as to reciprocate therewith and to have movement relative thereto, and a load weighing ring connected at one of its sides to said reciprocating frame and at its other side to said specimen engaging means whereby said frame together with said weighing ring and specimen engaging means all comprise a self-contained reciprocating unit.

18. A fatigue testing machine comprising, in combination, a base having a guideway, a reciprocating frame slidably supported by said guideway, a connecting rod pivotally connected to one end of said frame for reciprocating the same, specimen engaging means positioned at the other end of the frame, means for supporting said specimen engaging means directly on said frame so as to have bodily reciprocating movement therewith and to have movement relative thereto in the direction of reciprocation, and a load weighing ring movably connected at one end to said frame and at its other end to said specimen engaging means.

19. The combination set forth in claim 18 further characterized in that said means for movably supporting the specimen engaging means on the reciprocating frame includes a horizontal member interposed between the specimen engaging means and said weighing ring, a plurality of parallel stay plates having their corresponding ends connected respectively to said reciprocating frame and to said horizontal member to insure said relative movement thereof in a direction parallel to the direction of reciprocation of said frame.

20. A fatigue testing machine comprising, in combination, means for rigidly anchoring one end of the specimen, a reciprocating element connectable to the other end of the specimen, actuating means for reciprocating said element, mechanism for varying the stroke of said reciprocating element, load weighing mechanism responsive to the actual load transmitted to a specimen, and means operated by said weighing means for controlling said stroke adjusting mechanism thereby to maintain a substantially constant load on the specimen as it progressively fails.

21. A fatigue testing machine comprising, in combination, means for supporting a specimen, a reciprocable element connectable to the specimen to impart a pulsating load thereto, actuating means for reciprocating said element, means for adjusting the extent of reciprocation of said element, mechanism for determining the load applied to the specimen, means associated with said mechanism for controlling said adjusting means to maintain a predetermined loading effect on the specimen, and means for maintaining a stable position of adjustment of said adjusting means so long as a given series of pulsating loads reach a predetermined value.

FRANCIS BUCKINGHAM.